Figure 1:
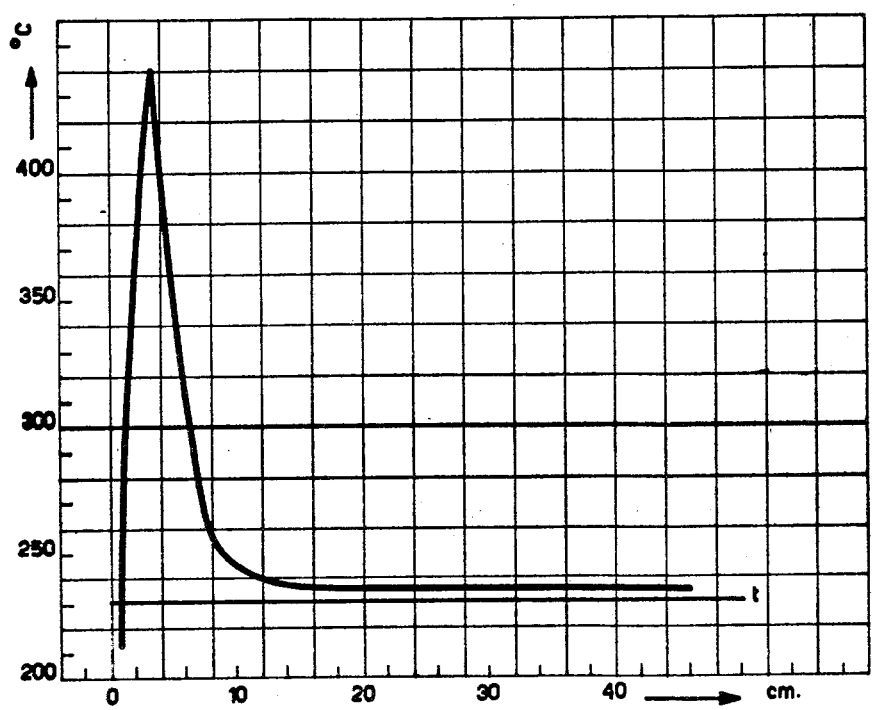

United States Patent Office 3,121,099
Patented Feb. 11, 1964

3,121,099
PROCESS FOR THE OXIDATION OF OLEFINS ON SILVER CATALYST GRADUATED SELECTIVITY
Harry Hermann Alfred Endler, Ferrara, Italy, assignor to Montecatini-Societa Generale per l'Industria Mineraria e Chimica, a corporation of Italy
Filed Mar. 2, 1961, Ser. No. 93,831
Claims priority, application Italy Mar. 4, 1960
4 Claims. (Cl. 260—348.5)

This invention relates generally to the stratified filling of reaction tubes in olefin oxidation with silver catalysts of different selectivities in accordance with the thermal requirements of the reactor.

The direct combination of ethylene with oxygen (also with atmospheric oxygen) can be effected with mixtures containing a wide range in the ratio between air and ethylene by using suitable catalysts, such as, for example, finely divided silver or silver oxide.

Ethylene oxide is obtained from a partial oxidation of ethylene. Unfortunately, however, part of the oxidation goes to completion, resulting in large amounts of carbon dioxide and water, aside from other secondary reaction products such as aldehydes, etc. From the mixture of these reaction products, ethylene oxide can be separated in various ways.

The oxidation is generally industrially performed by passing the reaction gases through a catalytic bed, within a reaction tube, kept at 150–350° C. The catalyst may be made up of activated silver, which is deposited on the surface of carriers of determined kind and form, e.g. porous spheres of aluminum oxide and silicon carbide. The reaction tube, wherein the catalytic bed is contained, is usually surrounded with a temperature regulating liquid, which is intended to disperse the reaction heat and to keep the catalytic layer at constant temperature.

The dispersion of heat constitutes an important problem in the industrial synthesis of ethylene oxide. Not only the 28 kcal./mole produced by the oxide formation, but also the 316 kcal./mole produced by the total combustion of ethylene to $CO_2$ and water, must be removed. When this last reaction predominates during the synthesis, the removal of all the heat from the catalytic bed becomes impossible and local overheatings are formed. The local overheatings occur more frequently in the initial portion of the catalyst bed where fresh reaction gases with high concentration of olefin and oxygen contact the catalyst. However, the local overheatings may occur in any portion of the catalyst layer. In the case of a local overheating in an upper portion of the catalyst layer, where there is a lowered concentration of the reagents, particularly of oxygen, a catalysis slowing down occurs, whereby the specific output is lessened. Deviations of the ideal isothermy of the catalytic bed cause an unequal distribution of oxide production along the reactor and in the case of drastic deviations, the very high temperatures of 600° C. and over, result in the total combustion of ethylene with the oxygen available in the system.

Many attempts and proposals have been made to uniformly distribute the heat development on the whole surface of silver catalysts.

R. Schultze et al. (Erdöl und Kohle, 5, 552 (1952)), have disclosed the preparation of catalysts with graduated activity by sieving the catalytic powder from the carrier grains, in order to charge the reactor so that impoverished grains are initially found in the catalytic bed, and the bulk of gaseous reagents meets grains progressively richer in silver.

In the U.S. Patent 2,764,598, Egbert claims the technique of filling the reactor with grains having a low silver content at the beginning of the catalytic bed, and a greater silver content towards the end thereof.

The above processes, however, do not attain the intended purpose. First, the amount of silver supported by the catalyst grains is a function of the carrier porosity and cannot be arbitrarily varied, since dusting of grains in the reactor during the synthesis occurs. Second, local overheatings cannot be avoided by merely lowering the silver content of the grains, since the catalytic efficiency of silver depends very little on the amount of the metal present. Moreover, the amount of heat developed on the active surface of the catalyst depends exclusively on the ratio according to which both antagonistic reactions proceed, i.e., ethylene oxidation to ethylene oxide and ethylene combustion to $CO_2$ and, therefore, it cannot be expected that the dilution of the powder on the carrier only shall be able to restrain the heat due to a well defined heat tone.

It has now been found that stratifying several catalysts of different selectivities produces an effective means to moderate the thermal development on the catalyst, to control the reaction course along the reactor in conformity with the concentration of the reagents, and to establish the premises for a practically isothermic oxidation.

An object of this invention is the particular stratified filling of the reaction tubes (where the olefin oxidation occurs) with catalysts having different catalytic properties to allow a more suitable distribution of olefinic oxide production on the catalyst grains along the whole length of catalytic bed during the natural course of heat development.

A further object of this invention is a reliable means to avoid the local overheatings of the catalyst and to establish isothermy condition on the silver catalyst.

In applicant's copending application Serial No. 771,724, filed November 4, 1958, a process has been described which produces, by incorporating halides in the silver catalyst, pronounced selectivity towards formation of olefinic oxides, to the prejudice of total combustion. When ethylene and oxygen are made to react on such a catalyst, the yield of ethylene oxide, defined as the ratio between the moles of formed oxide and the moles of converted ethylene, varies proportionately with increasing halide content of the catalyst.

It has now been found that catalysts of different but well defined selectivities are suitable to regulate, according to this invention, the heat development along the catalytic layer. The total amount of heat developing on the catalytic surface includes the heat due to total combustion and the heat due to oxide formation. Since the selectivity predetermines the activity ratio between both antagonistic reactions, and therefore also the total amount of heat produced, it becomes possible to regulate the heat development by inserting a catalyst of high selectivity in the catalytic layer undergoing the highest heating.

Figure 2:
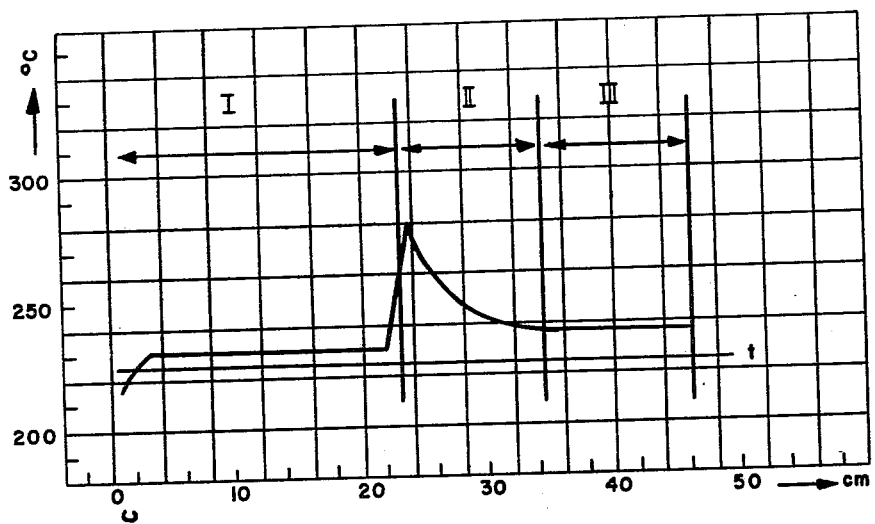
Figure 3:
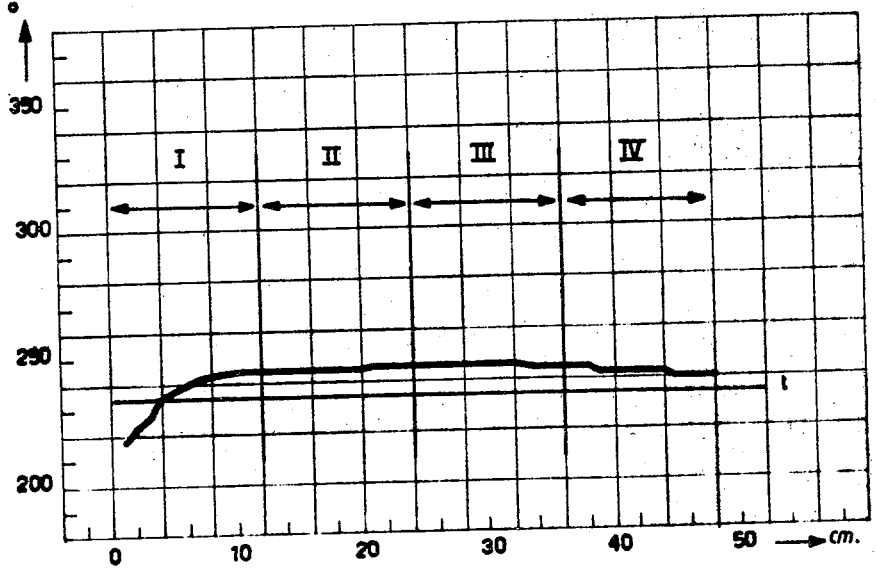

FIGS. 1 to 3 briefly relate to a pictorial representation of the temperature changes respectively of Examples 7, 6 and 5.

The following examples are given to illustrate, but not to limit, the scope of the present invention.

EXAMPLE 1

Silver catalyst is prepared according to the above mentioned copending application by precipitating silver carbonate together with alkaline earth metal carbonates while adding variable amounts of halides as follows:

40 g. silver nitrate and 19 g. calcium nitrate, crystallized with 4 moles water, are brought to volume of 600 cc. with distilled water. At the same time a 10% aqueous solution of 21 g. sodium carbonate is prepared. Before coprecipitating silver carbonates and those of alkaline earth metals, amounts to $CaCl_2$, varying from 1 to 130 mg./mol of silver nitrate present in the solution, according to the type of catalyst which is desired to precipitate, are added. For the sake of comparison, silver catalyst without CaCl₂ addition is also prepared. After coprecipitation, which is carried out by pouring the carbonate solution into the nitrate solution, the precipitate is filtered, washed and dried in an oven at 108° C.

40 g. catalytic powder are obtained of which 14 g., suspended in a 30% water solution of ethylene glycol, are imbibed on 100 cc. of porous aggregates of Carborundum (silicon carbide) of an average diameter of 6 mm., in a porcelain dish. Imbibition procedure includes evaporating said mixtures to dryness on a water bath while stirring. Catalyst grains prepared as above are dissociated in muffle furnace at 400° C. for 1 hour.

EXAMPLES 2 THROUGH 9

A reaction tube of 100 cc. capacity and having a diameter of 16 mm. is charged with different catalysts, as specified in each example in the table to show the effect, in the layer of catalytic bed where a strong heat development may be expected, when a catalyst of particular selectivity is inserted.

When a gaseous mixture with 3.8% ethylene, 7–8% oxygen, 7–8% carbon dioxide is passed through the reaction tube arranged as above, the reaction tube being situated in a thermostatic bath made up of melted sodium and potassium nitrates, the results listed in the following table are obtained, at different space velocities. By space velocity is meant the unitary normal volumes of gas passing on the apparent volume unity of catalyst. In the same table, the result of a test carried out with only one type of a normally charged catalyst is reported as comparison term for the single groups of tests.

The results assembled in the table refer to a wide range of synthesis conditions, ranging from very low to high space velocities, and show that the graduated arrangement within the reaction tube of catalysts with different selectivity, under whatever flow conditions, leads to an increase of the specific catalyst output, in comparison to catalysis carried out on arbitrarily superposed layers of catalyst, or on catalysts not sufficiently tuned to the natural heat development of the reaction. In order to show more clearly the necessity of the above mentioned ordered arrangement of the various catalysts according to the heat development and in the direction of gas stream, temperatures along the inside length of the catalytic bed have been measured; the diagrams of the enclosed drawings reflect the values achieved.

cates the local overheating due to excessive heat development. Ethylene oxide output corresponding to said peak is the lowest.

FIG. 2 illustrates the temperature course in a catalytic bed of different catalysts which, however, are not sufficiently tuned to the natural heat development of the reaction; said figure refers specifically to Example 6. As in FIG. 1, line $t$ indicates the bath temperature. The catalytic bed is divided in three zones containing 30, 15 and 0 mg. chlorine per 100 g. silver, respectively.

The peak of high temperature already shows a lesser slope and is shifted towards the center portion of the catalytic bed. The excessive heat, however, is still present. Nevertheless, the oxide output is remarkably improved in comparison to the preceding case.

FIG. 3 represents the temperature course in the ideal catalytic bed which, owing to the stratified arrangement of catalysts with different selectivity according to the invention, is not liable to phenomena of local overheating and allows the uniform distribution of catalysis along the whole reactor length to be obtained; the figure corresponds to Example 8. As in FIGS. 1 and 2, $t$ represents the bath temperature, and the four divisions represent zones of the catalytic bed containing different amounts of chlorine.

The first through fourth zones contain 35, 30, 25 and 20 mg. Cl per 100 g. silver, respectively. Participation of the entire catalyst bed in the synthesis is accompanied by increased catalytic efficiency and the improved utilization of the ethylene employed.

Apparent advantages of the isothermy attainable according to the method of this invention are as follows: uniform distribution of the output on the catalytic surface and complete utilization of the volume of aavilable catalyst. As a result, the equal participation of the entire catalyst in the reaction gives rise to a greater duration of its activity. Moreover, owing to the improved total yield, the ethylene saving is joined with a higher content of oxide in the reaction gas, which reduces the technical requirements of recovery.

The invention has been demonstrated utilizing a catalyst prepared by coprecipitating silver and alkaline earth metals as carbonates, and predetermining the selectivity of the finished catalyst by adding halides to the solution of the respective salts before coprecipitation. The dry catalytic powder was then supported on porous spherical

*Table 1*

| | Catalytic bed with catalysts of graduated selectivity | | Space velocity ($h^{-1}$) | Reaction temp. (° C.) | Percent vol. of ethylene oxide in the gas | Output (mg. EtO/h. 100 cc. cat.) | Yield |
|---|---|---|---|---|---|---|---|
| | cc. Ag cat. | mg. Cl/ 100 g. Ag | | | | | |
| Example 2 | 25<br>25<br>25<br>25 | 75<br>50<br>40<br>25 | 320 | 230 | 1.95 | 1,225 | 62.8 |
| Example 3 | 33<br>33<br>34 | 50<br>35<br>5 | 320 | 200 | 1.32 | 832 | 54.5 |
| Example 4 | 100 | 0 | 320 | 200 | 1.13 | 714 | 46.2 |
| Example 5 | 33<br>33<br>34 | 35<br>30<br>25 | 1,220 | 235 | 1.07 | 2,565 | 55.7 |
| Example 6 | 35<br>32<br>33 | 30<br>15<br>0 | 1,270 | 235 | 0.855 | 2,132 | 55.1 |
| Example 7 | 100 | 0 | 1,500 | 235 | 0.34 | 935 | 14.6 |
| Example 8 | 15<br>35<br>25<br>25 | 35<br>30<br>25<br>20 | 4,200 | 240 | 0.71 | 5,860 | 62.6 |
| | 100 | 15 | 3,900 | 235 | 0.48 | 3,675 | 44.6 |

FIG. 1 illustrates the temperature course in a catalytic bed of a single normal catalyst, which has been charged inordinately, and corresponds to Example 7. In the diagram the line $t$ represents the thermostatic bath temperature. As may be ascertained, at 3 cm. from the input side, a high temperature peak is found, which indiagglomerates of silicon carbide. Although this type of carrier is preferred, other carriers different therefrom either in form or in substance may be employed, e.g. alumina.

The degree of selectivity of the catalysts establishing the isothermy along the reactor cannot be determined "a priori," since it is bound with the general reaction conditions. In fact, in the field of catalysts on the basis of silver coprecipitated with alkaline earth metals, the catalysts with selectivity of 50–80% are suitable for the reactant charge in the synthesis at normal gas rates, whereas those with selectivity of 40–70% are also suitable for high gas rates.

I claim:

1. In a process for producing ethylene oxide by partial catalytic oxidation of ethylene wherein a reaction mixture of ethylene and free oxygen-containing gases, at temperatures between 150° and 350° C., are passed through a catalytic bed of silver catalysts of well defined selectivity, the improvement which consists of arranging the bed in zones of catalysts of decreasing selectivity in the direction of travel of the gaseous reaction mixture therethrough.

2. In a process for producing ethylene oxide by partial catalytic oxidation of ethylene where a gaseous reaction mixture of ethylene and oxygen, at temperatures between 150° and 350° C., are passed through a catalytic bed of silver catalysts, obtained by precipitating silver carbonate and alkaline earth metal carbonates, in the presence of minute amounts of halides and supported on porous agglomerates of silicon carbide, said silver catalysts having a well defined selectivity, the improvement which consists of arranging the bed in zones of decreasing selectivity in the direction of travel of the gaseous reaction mixture therethrough.

3. In a process for producing ethylene oxide by partial catalytic oxidation of ethylene wherein a reaction mixture of ethylene and air, at temperatures between 200° and 240° C., are passed through a catalytic bed of silver catalysts, obtained by precipitating silver carbonate and alkaline earth metal carbonates, in the presence of minute amounts of halides and supported on porous agglomerates of silicon carbide, said silver catalysts having a well defined selectivity, the improvement which consists of arranging the bed in zones of decreasing selectivity in the direction of travel of the gaseous reaction mixture therethrough.

4. In a process for producing ethylene oxide by partial catalytic oxidation of ethylene wherein a reaction mixture of ethylene and free oxygen-containing gases, at temperatures between 200° and 240° C., are passed through a catalytic bed of silver catalysts, obtained by precipitating silver carbonate and alkaline earth metal carbonates, in the presence of minute amounts of halides and supported on porous agglomerates of silicon carbide, said silver catalysts having a well defined selectivity, the improvement which consists of arranging the bed in zones of decreasing selectivity in the direction of travel of the gaseous reaction mixture therethrough.

References Cited in the file of this patent

UNITED STATES PATENTS

| | | |
|---|---|---|
| 2,393,240 | Dreyfus | Jan. 22, 1946 |
| 2,764,598 | Egbert | Sept. 25, 1956 |
| 2,825,701 | Endler et al. | Mar. 4, 1958 |